United States Patent [19]

Morishita et al.

[11] 3,859,228

[45] Jan. 7, 1975

[54] METHOD OF MICROCAPSULE PREPARATION

[75] Inventors: Masataka Morishita; Yoshihito Inaba; Sadami Kobari; Mitsuru Fukushima; Jinnosuke Abe, all of Shizuoka, Japan

[73] Assignees: Toyo Jozo Co., Ltd., Tagatagun, Shizuoka; Fuji Photo Film Co., Ltd., Kanagawa, both of, Japan

[22] Filed: July 31, 1972

[21] Appl. No.: 276,309

[30] Foreign Application Priority Data
July 30, 1971   Japan.............................. 46-57746

[52] U.S. Cl............. 252/316, 117/100 A, 252/364, 424/33, 424/35, 424/94, 424/181, 424/254
[51] Int. Cl.......................... B01j 13/02, B44d 1/02
[58] Field of Search................. 252/316; 117/100 A; 424/33, 35

[56] References Cited
UNITED STATES PATENTS

| | | | |
|---|---|---|---|
| 3,161,602 | 12/1964 | Herbig et al. | 252/316 |
| 3,415,758 | 12/1968 | Powell et al. | 252/316 |
| 3,523,906 | 8/1970 | Vrancken et al. | 252/316 |
| 3,714,065 | 1/1973 | Kitajima et al. | 252/316 |

Primary Examiner—Richard D. Lovering
Attorney, Agent, or Firm—Craig & Antonelli

[57] ABSTRACT

A novel method of microcapsule preparation is presented. A polymer for wall film is dissolved in a solvent, having a dielectric constant in the vicinity from 10 to 40 and poorly miscible with a vehicle, i.e, a liquid paraffin or a silicone oil. The solution is emulsified in said vehicle. A core substance which is soluble in the solvent and has a particle size of 100 to $1500\mu$, is dispersed into this emulsion. The emulsion drops of the polymer solution cohere around the cores and envelop them. Finally, the solvent is removed through evaporation under stirring to obtain concentric spherical microcapsules. This method is suitable for the preparation of microcapsules of various substances, especially those unstable to heat, pH, etc., such as medicaments.

12 Claims, No Drawings

METHOD OF MICROCAPSULE PREPARATION

This invention relates to a new method for microcapsule preparation. More particularly, this invention relates to a process for producing microcapsules, which comprises emulsifying into a vehicle, i.e. a liquid paraffin or a silicone oil, a wall-material polymer solution dissolved in a solvent, having a dielectric constant in the vicinity from 10 to 40 and being poorly miscible with said vehicle to prepare an emulsion, subsequently dispersing into the emulsion a core which is soluble in the solvent and has a particle size of 100 to 1500μ to effect cohesion and envelopment of the emulsified drops around the core substance, and finally evaporating said solvent through the vehicle by stirring the dispersion under heating or reduced pressure to precipitate the polymer in state of a film around the core substance.

Among the methods for microcapsule preparation of prior art, there have heretofore been known several methods which belong to a category of the drying-in-liquid method, wherein a core substance is dispersed in a wall-material polymer solution and the polymer is precipitated around the core substance. One method is to emulsify a core substance which is water or in state of an aqueous layer into a polymer solution dissolved in a solvent, being immiscible with said core substance and having a boiling temperature lower than 100°C, disperse the thus prepared emulsion in a medium of a hydrophilic aqueous colloid solution and remove the polymer solvent through evaporation. This method involves a drawback that the core substance is limited only to water or a substance in state of an aqueous layer. Another drawback of this method is that no microcapsule but those containing liquids can be produced. It further includes a drawback that no solvent having a boiling temperature higher than that of water can be used since a hydrophilic aqueous colloid solution is used as a medium. According to another method, for capsule formation, an aqueous solution of a water-soluble core substance is emulsified into a polymer solution dissolved in an organic solvent immiscible with water to prepare an emulsion (W/O), which is further dispersed into a medium such as an aqueous solution containing surface active agents, a hydrophilic aqueous colloid solution containing salts or an aqueous hemoglobin solution to prepare an emulsion (W/O)/W and finally the organic solvent is evaporated to precipitate the polymer around the aqueous solution. Since the core substance is treated in state of an aqueous solution in this method similarly as in the first method, this method is unsuitable for microcapsule formation of a substance unstable to water. Further drawback of this method is that a substance soluble in the polymer solvent cannot be used. As an alternative method, it is also proposed to prepare capsules by dispersing a core substance of aspirin powders into a solution of a polymer dissolved in an organic solvent and thereafter dispersing the dispersion in state of drops into a concentrated aqueous solution of a salt. However, the microcapsules obtained by this method are in such a state that the core aspirins are combined by the polymer as in concrete, so that the core substance may be exposed on the polymer surface.

We, the present inventors have now found that by first effecting an emulsion disperson in state of minute drops of a polymer solution into a vehicle instead of directly dispersing a core substance into a polymer solution, subsequently dispersing a core substance which is soluble in the solvent and has a particle size of 100 to 1500μ into this emulsion to effect cohesion and envelopment of the emulsion drops of the polymer solution around the core substance and then evaporating the polymer solvent, there can be obtained concentric spherical microcapsules surrounded by polymeric walls entirely different from concretelike shapes, which are excellent in quality of envelopment of the core substance, i.e., without exposure of the core substance out of the capsule until the wall films are broken under certain conditions.

The present invention provides a process for producing microcapsules, which comprises (1) dissolving a polymer in a solvent, having a dielectric constant in the vicinity from 10 to 40 and being poorly miscible with a vehicle as set forth below, (2) effecting an emulsion dispersion in minute drops of this solution in a vehicle i.e. a liquid paraffin or a silicone oil, (3) subsequently dispersing into the thus prepared emulsion under stirring a core substance which is soluble in the solvent and has a particle size of from 100 to 1500μ, and thereafter (4) evaporating the polymer solvent under stirring.

An object of the present invention is to effect a highly efficient microcapsule formation of a water-soluble substance. Another object of the present invention is to effect a microcapsule formation of a substance unstable to heat at an ordinary temperature. Furthermore, another object of the present invention is to provide a method for microcapsule formation in which various polymers soluble depending on pH such as a stomach-soluble polymer, an intestine-soluble polymer, etc., can widely be used as a polymer for wall-material. Still further, another object of the present invention is to provide a method for microcapsule formation in which a liquid paraffin or a silicone oil, which is most inert in solubility, reactivity or toxicity, is used as a medium liquid for capsule formation. It is also an object of the present invention to provide a method for microcapsule formation in which a core substance which is soluble in the solvent can be encapsulated favorably without being dissolved in said solvent. It is still another object of the present invention to provide a method for microcapsule formation in which a polymer solution is emulsively dispersed into a vehicle, a core substance which is soluble in the solvent and has a particle size of 100 to 1500μ is dispersed into the thus prepared emulsion to effect cohesion and envelopment of the emulsified drops around the core substance. It is further object of the present invention to provide a method for producing microcapsules having a wall-film of a polymer excellent in quality of envelopment formed around the core substance. Other objects of the present invention will become apparent in the further detailed explanation hereinafter disclosed.

Core substance

As a core substance, any solid substance may be used in the present invention, so long as it is soluble in the polymer solvent and insoluble in and inert to a liquid paraffin or a silicone oil which is a medium liquid for capsule formation. Either substance, whether it may be water-soluble, unstable to heat or poorly resistant to humidity, may be formed into microcapsules in accordance with the process of the present invention. The size of a core substance particle is required to be from 100 to 1,500 microns.

Capsule-forming medium liquid

In the present invention, a liquid paraffin or a silicone oil may be available as a vehicle. Since these vehicles are most inert in solubility, reactivity or toxicity, they are suitable for capsule formation of medicaments or other reactive substances. Typical example of a liquid paraffin is a fluid paraffin. Above all, the fluid paraffin No. 4 which is relatively high in viscosity may preferably be used among the fluid paraffins from No. 1 to No. 4 according to the Japanese Industrial Standard. Particularly, the fluid paraffin with a viscosity of 19 c.p.s. (at 25°C) according to the Japanese Pharmacopeia having little toxicicity is the most suitable medium for microcapsule formation of medicaments. Halogenated paraffins may also be used in the present invention. The silicone oils which may be used in the present invention include methyl silicone oil, dimethyl silicone oil, phenyl silicone oil, methyl phenyl silicone oil and the like. It is preferred to use a vehicle for capsule formation having a viscosity in the range from 10 to 30 c.p.s. at 25°C).

Solvent

A solvent which is capable of dissolving a polymer for wall-material can be used in the present invention. It should have a dielectric constant in the vicinity from 10 to 40, more preferably from 15 to 35. The solvent to be used in the present invention should be entirely immiscible or poorly miscible, at most to an extent up to 15 % with the vehicle. The solvent should have a boiling point lower than that of the vehicle. Even a solvent having a dielectric constant lower than 10 may be used by being admixed with other solvents, if it can advantageously be used as a polymer solvent. Among the solvents, those having a lower boiling temperature are easy to evaporate without heating, so that they are suitable for microcapsule formation of a substance which is unstable to heat. For example, methanol, ethanol, isopropanol, acetone or a mixed solvent thereof are particularly preferred.

Polymer

In the present invention, the polymer is selected from cellulose acetate, hydroxy propyl methyl cellulose, hydroxy propyl methyl cellulose phthalate, cellulose acetate dibutylamino haydroxy propyl ether, cellulose acetate phthalate, hydroxy ethyl cellulose, hydroxy propyl cellulose, benzyl cellulose, benzyl aminomethyl cellulose, diethylamino cellulose, polyacrylic acid ester, polymethacrylic acid ester, methyl acrylate-methacrylic acid copolymer, polyvinyl acetal diethylamino acetate, 2-methyl-5-vinylpyridine-methacrylate-methacrylic acid copolymer, and vinylethylamine vinylacetate copolymer. It is required, however, to choose a polymer which is fitted for the use or the manner of use of microcapsules. In the following, examples of preferable combinations of polymers and solvents are given:

| Polymers | Solvents |
|---|---|
| Hydroxypropyl cellulose | Methanol; Ethanol; Acetone; Isopropanol; Methanol-ethylcellosolve (6 : 4) |
| 2-methyl-5-vinylpyridine methacrylate-methacrylic acid copolymer | Methanol; Ethanol; Acetone |
| Benzyl aminomethyl cellulose | Methanol; Acetone |
| Cellulose acetate dibutylamino hydroxypropyl ether | Methanol; Ethanol; Acetone |
| Vinyldiethylamine-vinyl acetate copolymer | Acetone |
| Polyvinylacetal diethylamino acetate | Methanol; Ethanol; Acetone |
| Cellulose acetate phthalate | Acetone; Methanol-Acetone |
| Hydroxypropyl methyl cellulose phthalate | Acetone; Methanol-Acetone; Ethanol-Acetone |
| Cellulose acetate | Acetone |
| Polyacrylic acid ester | Acetone |
| Polymethacrylic acid ester | Acetone |
| Polyvinyl acetate phthalate | Acetone |
| Methyl acrylate-methacrylic acid copolymer | Acetone |

Process for preparing microcapsules

In the practice of the process according to the present invention, at first a wall material polymer is dissolved in a solvent. Although the concentration of a polymer may be variable depending on the combination of a polymer and a solvent, it may optionally be chosen so long as the viscosity of the solution is within such a range, as to make an emulsion dispersion of the solution into a vehicle possible. Ordinarily, however, it is about from 5 to 20 W/V %. As the concentration is increased, wall films formed become thicker to give hard microcapsules. On the contrary, as the concentration is descreased, wall films formed become thinner.

As the next step, the polymer solution is emulsively dispersed into a vehicle. The quantitative ratio of the polymer solution to a vehicle, which may be variable depending on the polymer concentration, is generally 1 : 3 or more, preferably 1 : 3 to 1 : 20(V/V). If the amount of the solvent is too much, the viscosity of the emulsified drops becomes too low. As the result, when a core substance is added and dispersed into the emulsion, the emulsified drops cohere to each other in place of the cohesion of the emulsified drops around the core substance, which does not occur before a certain amount of the solvent is removed through evaporation by means of stirring, etc. On the contrary, if the amount of the solvent is too little, the cohered emulsified drops become solidified before they are spread in layers around the core substance, whereby microcapsules having granular polymer attached on the surface of the core substance may be formed or the polymers may be precipitated apart from the core substance. Since the viscosity of the emulsifed drops differs depending on such a combination of factors as the species of a polymer and its solvent and their relative amounts, it is required to choose a concentration of a polymer according to such a combination to achieve desirable cohesion and envelopment of the emulsified particles of polymer solution around the core substance. In advance of the emulsive dispersion as mentioned above, surface active agents may preferably be added to the vehicle in an amount of 0.1 to 2.0 W/V %, whereby the polymer solution can be easily emulsified and the state of dispersion becomes extremely stable to give favorable results. For example, sorbitane alkyl esters such as Span 85 (Registered Trade mark, product of Tokyo Chemical Industry Co.), polyoxyethylene sorbitane alkyl esters such as Tween 81 (Registered Trade mark, product of Tokyo Chemical Industry Co.), lanoline derivatives such as Lanex (Registered Trade mark, product of Croda Nippon Co.), polyoxyethylene alkyl ethers such as Nonion K-204 (Registered Trade mark, product of Nippon Oils and Fats Co. Ltd.), etc. can be used as suitable surface active agents.

Into the emulsion thus prepared is subsequently dispersed a core substance under stirring. The core substance to be used is from 100 to 1,500 microns in size. However, if the particles of a core substance are too small, they should be made into suitable size of minute spherical bodies before they are dispersed into the emulsion. In order to disperse the core substance into the emulsion and effect cohesion and envelopement of the emulsified drops, i.e. the polymer liquid drops, around this core substance, it is preferred that the concentration of the polymer in said emulsified drops is 20 to 30 W/V % and the emulsion state is kept homogeneous and stable at a low temperature below 10°C. By the effect of stirring, the emulsified drops of the polymer solution cohere around the core substance. The cohered drops are spread by centrifugal force in state of layers to envelop the core substance. Then, the solvent is evaporated through the vehicle by gradually heating the core substance dispersion or by keeping the suspension under reduced pressure until the polymer is precipitated around the particles of the core substance. The size of the microcapsule obtained depends on that of the core substance. Accordingly, if the core substance used is of uniform size, microcapsules uniform in size can be obtained. Furthermore, the thickness of wall films can be controlled by varying suitably the concentration of the polymer dissolved in the solvent and the relative amount of the polymer to the core substance.

The microcapsules are then recovered by filtration or centrifugal separation and washed in a solvent which is well miscible with the medium liquid for capsule formation and will not dissolve or destruct the microcapsules.

The microcapsules obtained according to the present invention are shaped in concentric spheres and excellent in quality of envelopment due to the polymeric wall film around the core substance. The core substance contained in the microcapsules will not be leaked out of the capsule until the wall films thereof are destructed under certain conditions.

The present invention will now be further illustrated by the following Examples, in which the core substance, the polymer, the solvent their amounts, emulsifying or dispersing conditions are merely exemplary embodiments of the present invention and they should not be construed to restrict the scope of the present invention.

EXAMPLE 1

16 Grams of powders (1 to 5μ) of an anti-inflammetric enzyme Retikinonase (product of Toyo Jozo Co.) and 2 g of talcum (1 to 5μ) are dispersed homogeneously into 40 ml of 5% acetone solution of an intestine-soluble polymer HPMCP (product of Shinetsu Chemical Co.). This dispersion is dispersed under stirring into the liquid paraffin of the Japanese Pharmacopeia containing 0.5 W/V% Lanex so that the liquid drops may become 400 to 800μ in size. The stirring is further continued until acetone is evaporated to obtain concrete-like spherical particles (400 to 800μ) containing 80% of the anti-inflammetric enzyme. These particles are provided as the core substance in the subsequent microcapsule preparation without washing, with the liquid paraffin adhered thereon.

Three grams of an intestine-soluble polymer, i.e., HPMCP are dissolved in 30 ml acetone. This solution is dispersed into 600 ml liquid paraffin of the Japanese pharmacopeia (19 c.p.s.) containing 0.5 W/V% Lanex by means of a homogenizer (10,000 r.p.m.) to form 0.5 to 5.0μ emulsion drops. Then, under stirring with a propeller (300 r.p.m.), 20 g of the previously prepared core particles containing anti-inflammetric enzyme are added to the emulsion. The temperature of the liquid is gradually raised up to 25°C. in three hours, whereby acetone is evaporated through the liquid paraffin until solid films of HPMCP are precipitated around the core substance to produce intestine-soluble microcapsules with 600 to 1,000μ in size. The liquid paraffin attached to the capsule walls is washed off with benzene and dried to obtain 22 g microcapsules.

EXAMPLE 2

An intestine-soluble polymer, namely hydroxy propyl methyl cellulose phthalate (HPMCP: product of Shinetsu Chemical Co.), is dissolved in a mixed solvent of methanol-acetone (95:5) at a concentration of 10 W/V %. Twenty (20) ml. of this solution are emulsified into 200 ml. liquid paraffin of the Japanese Pharmacopeia (19 c.p.s. at 25°C) containing 0.5 W/V % Lanex (product of Croda Nippon Co.) under cooling at 5°C, while stirring with a homogenizer (10,000 r.p.m.). An emulsion containing 0.3 to 2.0 μ emulsified drops is obtained. While stirring this emulsion under cooling, 8.0 g. granules (200 to 500 μ) of an antibiotic core substance, namely Kitasamycin tartrate (product of Toyo Jozo Co.) are added to the emulsion. The emulsified drops are observed to agglomerate around the granules of the core substance and the cohered drops become to be combined to each other on the surface of the core substance to form film-like envelopment as the stirring is continued. In this state, the emulsified turbid paraffin becomes transparent as the emulsified drops cohere around the core substance. Stirring is further continued and the temperature is gradually raised up to about 30°C. until the mixed solvent is evaporated out of the system through the liquid paraffin medium. After about three to four hours, solid wall films are precipitated around the core substance to obtain microcapsules with sizes from 300 to 700 μ. The microcapsules are separated from the liquid paraffin by decantation, washed several times with n-hexane and dried under reduced pressure to obtain intestine-soluble microcapsules of antibiotic Kitasamycin tartrate. The disintegration test of the microcapsules is conducted according to the test method of the Japanese Pharmacopeia (Eighth Revision). That is, 2.0 g sodium chloride and 24.0 ml. dil. hydrochloric acid are made into 1000 ml. aqueous solution to prepare the first liquid (pH=1.2). When the microcapsules are shaked in this liquid at 28 to 30 strokes with 50 to 60 mm. stretch at a liquid temperature of 37°± 2°C. for 120 minutes, no disintegration is observed. Then, 35.8 g. sodium hydrogen phosphate and 6.0 ml. dil. hydrochloric acid are made into 1,000 ml. aqueous solution to prepare the second liquid (pH=7.5), in which the microcapsules are shaken under the same conditions as mentioned above, with the result that they are completely broken within 30 minutes.

Since the core substance herein used, i.e., Kitasamycin is comparatively unstable at a low pH, protection of this substance from gastric juice by means of intestine-soluble microcapsule formation is very significant. In addition, as the microcapsules are by far smaller in size as compared with the enteric coated tablets in general, they can be more rapidly dissolved in intestinal juice and advantageous in the intestinal canal absorption. As Kitasamycin is soluble in the mixed solvent, of methanol and acetone a portion of this core substance is slightly dissolved into the emulsified drops when they cohere to the surface of the core substance. Accordingly, the inner part of the wall film of the microcapsule formed is in a state wherein the polymer and core substance are admixed.

EXAMPLE 3

An intestine-soluble polymer HPMCP is dissolved in a mixed solvent of methanol-acetone (3:1) at a concentration of 5 W/V %. Forty ml. of this polymer solution are cooled at 2° to 5°C. and added into 400 ml. liquid paraffin of the Japanese Pharmacopeia containing 0.25 W/V % Lanex and emulsified under stirring with a propeller(300 r.p.m.) to form 20 to 60 $\mu$ emulsified drops. After the emulsion is stirred about 30 minutes under the same conditions, 14 g. Kitasamycin granules (200 to 500 $\mu$) which had been prepared similarly as in Example 1 are added thereto. Then, microcapsulation is effected in the same manner as described in Example 1 to obtain 400 to 1,000 $\mu$ microcapsules.

EXAMPLE 4

Two grams of a methyl acrylate-methacrylic acid copolymer (Eudragit S: product of Rohm and Haas Co. in U.S.A.) are dissolved in 40 ml. acetone. This polymer solution is added into 400 ml. liquid paraffin of the Japanese Pharmacopeia containing 0.25 W/V % Lanex under stirring with a propeller and emulsified to form 10 to 50 $\mu$ emulsified drops. The stirring is still continued about 50 minutes under the same condtions and then 8 g. antibiotic Kitasamycin granules (200 to 500 $\mu$) which had been prepared similarly as in Example 1 are added into the emulsion, whereby the emulsified drops agglomerate around the core substance to form coated films. The stirring is further continued for about 5 hours, during which the liquid temperature is gradually raised up to 30°C, until the polymeric films become solidified to give intestine-soluble microcapsules containing Kitasamycin. The microcapsules are separated from the liquid paraffin by decantation, washed 3 to 4 times with petroleum ether and dried at a low temperature to obtain 300 to 800 $\mu$ microcapsules.

EXAMPLE 5

Two grams of polyvinylacetal diethylamino acetate (AEA: product of Sankyo Co.) are dissolved in 20 ml. acetone. The solution is emulsively dispersed into a liquid paraffin of the Japanese Pharmacopeia containing 0.5 W/V % Lanex by means of a homogenizer(from 0.5 to 1.5 $\mu$ drops). While the emulsion is cooled to 5°C and stirred with a propeller, 8 g. barbital powders (300 to 700 $\mu$) which had been prepared similarly as in Example 1 are added thereto. While stirring is continued, the liquid temperature is gradually lowered to about 30°C. Solid polymeric wall films are precipitated around the core substance within 4 hours to give stomach-soluble microcapsules (500 to 1,000 $\mu$ in size).

The core substance, i.e., barbital, herein used is small in solubility in the polymer solvent, acetone, as compared with the antibiotic Kitasamycin used in the above Examples. Hence, upper-coating is easier for this substance and the border line is clear between the core substance and the wall film. The above microcapsules are not broken by mere wetting with water unless they are brought under acidic conditions. In the first liquid (pH 1.2) according to the disintegration test of the Japanese Pharmacopeia (Eighth Revision), the microcapsules are shaken at 37°C. with the result that they are completely disintegrated within 10 minutes.

What we claim is:

1. A process for preparing microcapsules, which comprises:
   1. dissolving a polymer for the capsule's wall-film selected from the group consisting of cellulose acetate, hydroxypropyl methyl cellulose, hydroxy propyl methyl cellulose phthalate, cellulose acetate dibutylamino hydroxypropyl ether, cellulose acetate phthalate, hydroxyethyl cellulose, hydroxy propyl cellulose, benzyl cellulose, benzyl aminomethyl cellulose, diethylamino cellulose, polyacrylic acid ester, polymethacrylic acid ester, methylacrylatemethacrylic acid copolymer, polyvinyl acetal diethylamino acetate, 2-methyl-5-vinylpyridine-methacrylate-methacrylic acid copolymer and vinylethylamino-vinyl acetate copolymer in a solvent having a dielectric constant of from 10 to 40,
   2. emulsifying the solution so produced in a vehicle which is a liquid paraffin or a silicone oil, said vehicle and said solvent being poorly miscible with one another,
   3. dispersing into the emulsion so produced with stirring a core substance have a particle size of from 100 to 1,500$\mu$ and being soluble in said solvent, and
   4. evaporating said solvent.

2. A process according to claim 1, wherein said solvent is methanol, ethanol, isopropanol, acetone or a mixture thereof.

3. A process according to claim 1, wherein said vehicle is a liquid paraffin, a halogenated paraffin, methyl silicone oil, dimethyl silicone oil, phenyl silicone oil, or methyl phenyl silicone oil having a viscosity of 10 to 30 c.p.s. (at 25°C).

4. A process according to claim 1, wherein the concentration of polymer in said solution is about 5 to 20% and the volume ratio of the polymer solution to said vehicle is at least about 1 : 3.

5. A process according to claim 1, wherein said core substance is dispersed into said emulsion when the concentration of polymer in the emulsified drops of solution is 20 to 30 W/V%.

6. A process according to claim 1, wherein said vehicle further includes about 0.1 to 2.0% by weight of a surface active agent.

7. A process for preparing microcapsules, which comprises:
1. dissolving a polymer for the capsule's wall-film selected from the group consisting of cellulose acetate, hydroxypropyl methyl cellulose, hydroxy propyl methyl cellulose phthalate, cellulose acetate dibutylaminohydroxy propyl ether, cellulose acetate phthalate, hydroxyethyl cellulose, hydroxypropyl cellulose, benzyl cellulose, benzyl aminomethyl cellulose, diethylamino cellulose, polyacrylic acid ester, polymethacrylic acid ester, methyl acrylatemethacrylic acid copolymer, polyvinylacetal diethylaminoacetate, 2-methyl-5-vinylpyridine-methacrylate-methacrylic acid copolymer and vinyl ethylamino-vinyl acetate copolymer in a solvent having a dielectric constant of from 10 to 40 to form a solution, the concentration of said polymer in said solution being about 5 to 20% by weight,
2. emulsifying said solution into at least three times as much by volume of a liquid vehicle comprising paraffin or a silicone oil and containing about 0.1 to 2.0 weight % of a surface active agent and having a viscosity of 10 to 30 c.p.s. at 25°C,
3. dispersing a core substance having a particle size of from 100 to 1,500μ and being soluble in said solvent in the emulsion, and
4. evaporating the solvent.

8. The process according to claim 7, wherein said solvent is methanol, ethanol, isopropanol, acetone or a mixture thereof.

9. A process according to claim 7, wherein said vehicle is liquid paraffin a halogenated paraffin, methyl silicone oil, dimethyl silicone oil, phenyl silicone oil or methyl phenyl silicone oil.

10. A process according to claim 7, wherein said core substance is dispersed into said emulsion when the concentration of a polymer in the emulsified drops of solution is about 20 to 30%.

11. A process according to claim 7, wherein said cord substance is composed of minute spherical bodies having a diameter of from 100 to 1,500μ, each spherical body being formed from a plurality of core material particles having a particle size of less than 100μ.

12. A process for preparing microcapsules, which comprises:
1. dissolving a polymer for the capsule's wall-film selected from the group consisting of cellulose acetate, hydroxypropyl methyl cellulose, hydroxy propyl methyl cellulose phthalate, cellulose acetate dibutylamino hydroxpropyl ether, cellulose acetate phthalate, hydroxyethyl cellulose, hydroxy propyl cellulose, benzyl cellulose, benzyl aminomethyl cellulose, diethylamino cellulose, polyacrylic acid ester, polymethacrylic acid ester, methylacrylate-methacrylic acid copolymer, polyvinyl acetal diethylamino acetate, 2-methyl-5-vinylpyridine-methacrylate-methacrylic acid copolymer and vinylethylamino-vinyl acetate copolymer in a solvent having a dielectric constant of from 10 to 40,
2. emulsifying the solution so produced in a vehicle which is a liquid paraffin or a silicone oil, said vehicle and said solvent being substantially immiscible with one another,
3. dispersing into the emulsion so produced with stirring a core substance having a particle size of from 100 to 1,500μ and being soluble in said solvent, and
4. evaporating said solvent.

* * * * *